A. O. BUCKIUS, Jr.
TRUCK SIDE FRAME.
APPLICATION FILED NOV. 9, 1910.
996,035.
Patented June 20, 1911.
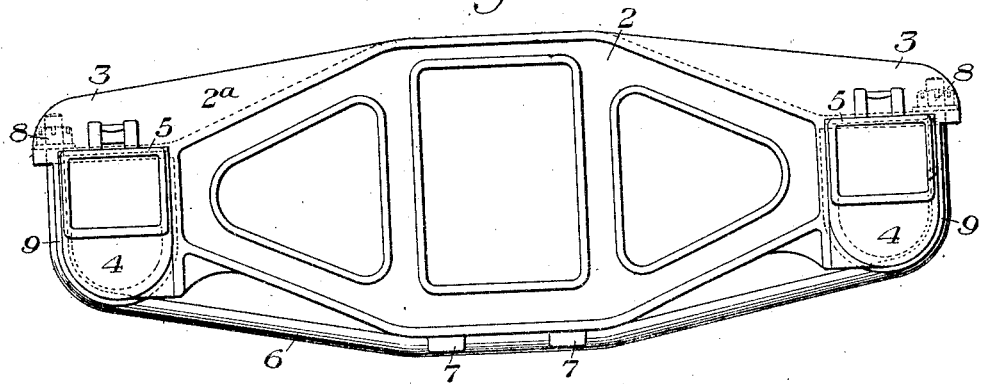
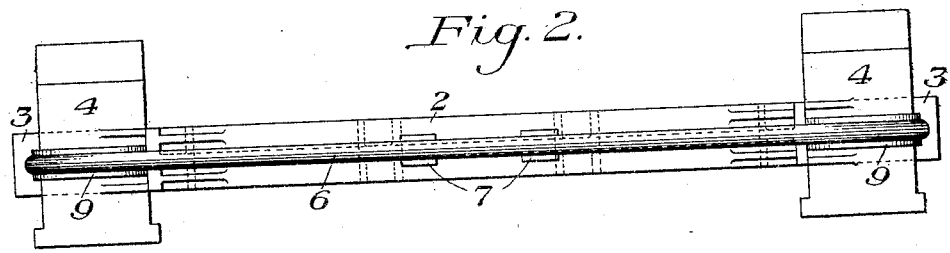
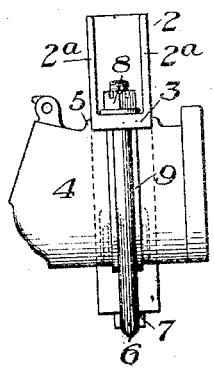
WITNESSES
INVENTOR

UNITED STATES PATENT OFFICE.

ALBERT O. BUCKIUS, JR., OF CHICAGO, ILLINOIS, ASSIGNOR TO THE NATIONAL MALLEABLE CASTINGS COMPANY, OF CLEVELAND, OHIO, A CORPORATION OF OHIO.

TRUCK SIDE FRAME.

996,035.          Specification of Letters Patent.     Patented June 20, 1911.

Original application filed September 10, 1910, Serial No. 581,464. Divided and this application filed November 9, 1910. Serial No. 591,483.

*To all whom it may concern:*

Be it known that I, ALBERT O. BUCKIUS, Jr., of Chicago, Cook county, Illinois, have invented a new and useful Improvement in Truck Side Frames, of which the following is a full, clear, and exact description, reference being had to the accompanying drawings, forming part of this specification, in which—

Figure 1 is a side view of a truck side frame embodying my invention; Fig. 2 is a bottom plan view; and Fig. 3 is an end view.

My invention has relation to certain new and useful improvements in truck frames for cars, the present application being a division of my pending application Serial No. 581,464, filed September 10th, 1910.

The object of my invention is to provide the side frames of a car truck with means of simple, novel and efficient character for securing the journal boxes thereto. My invention provides means of this character, in which the journal boxes are firmly held, both laterally and vertically, to their seats on the side frame, and secures all the advantages of a construction in which the journal boxes are cast integrally with the side frame without any of the disadvantages of such a construction.

Referring to the accompanying drawings, the numeral 2 designates the side frame of the car truck, which is provided at its ends with the overhanging portions 3.

4 are the journal boxes, which are held in the seats formed by the under side of these overhanging portions 3 and by the vertical end walls of the side frame proper. The journal boxes are preferably provided with ribs or flanges 5 at the top to engage the sides of the overhanging portions 3.

The journal boxes are secured in place by means of a truss member or rod 6, which extends underneath the side frame, being provided at its central portion with suitable bearings at 7 upon the bottom of the side frame, and having its end portions extending underneath the journal boxes and thence upwardly at the outer sides thereof and through the overhanging portions 3. Both ends of the truss-member are perfectly threaded to receive securing and adjusting nuts 8, these nuts being preferably seated between the side flanges 2ª of the portions 3. The journal boxes are also preferably provided with suitable flanges 9 to form seats or guides for the member 6. The boxes are shown as having convex lower portions around which the member 6 is bent, so that when this member is drawn firmly to its seat by means of the nuts 8, the boxes will not only be drawn upwardly into securing contact with the seating faces at the under side of the portions 3, but will also be drawn laterally against the vertical seating faces at the ends of the side frame.

By the construction described I provide means whereby the journal boxes may be rigidly secured in place, but which will permit their ready removal when desired. This gives a construction which has all the advantages of a construction in which the boxes are cast integral with the side frames, but which avoids the difficulties due to variations in the shrinkage of metal. It also provides a construction in which either one of the boxes can be readily removed and replaced when necessary, which is not possible with the integral construction. It also permits the ready removal of the wheels and axles, together with the boxes, from the side frames, when desired.

What I claim is:—

1. In a truck frame, a side member having overhanging end portions provided with journal box seats at the under side thereof, and a securing member extending longitudinally underneath the side frame and having its end portions secured in the overhanging portions of the truck frame, said member being adapted to engage the journal boxes and hold them to their seats; substantially as described.

2. In a truck frame, a side member having overhanging end portions provided with journal box seats at the under side thereof, and a securing member extending longitudinally underneath the side frame and having its end portions adjustably secured in the overhanging portions of the truck frame, said member being adapted to engage the journal boxes and hold them to their seats; substantially as described.

3. In a truck frame, a side member having vertical journal box seating portions at its end, and also having overhanging portions extending beyond said seating portions, and a continuous member extending longitudinally of the frame and having a bearing at the under side thereof at its central portion, the ends of the member extending upwardly into the overhanging portions of the frame and secured therein, said rod being arranged to engage journal boxes and hold them firmly against their seats; substantially as described.

4. In a car truck, a side frame having journal box seats at its end portions, said seats being open at the bottom and outer sides, boxes in said seats, and a continuous securing member embracing the outer and lower sides of the boxes and securing them to their seats; substantially as described.

5. In a car truck, a side frame having journal box seats at its end portions, said seats being open at the bottom and outer sides, boxes in said seats, and a continuous securing member embracing the outer and lower sides of the boxes and securing them to their seats, said member having a bearing at its central portion upon the under side of the side frame and having its end portions secured in the end portions of the side frame; substantially as described.

6. In a car truck, a side frame having journal box seats at its end portions, said seats being open at the bottom and outer sides, boxes in said seats, and a continuous securing member embracing the outer and lower sides of the boxes and securing them to their seats, said member having a bearing at its central portion upon the under side of the side frame and having its end portions secured in the end portions of the side frame, and the boxes having grooves or guides to receive the member; substantially as described.

7. A truck side frame having at each end two bearing faces at an angle to each other, journal boxes seated against said faces, and a continuous securing member engaging the boxes and arranged to draw both of them upwardly and inwardly against said faces; substantially as described.

In testimony whereof, I have hereunto set my hand.

ALBERT O. BUCKIUS, Jr.

Witnesses:
LOUIS W. DE WITT,
TOM H. ROBINSON.